NO PRINTED SPECIFICATION AVAILABLE
BEST AVAILABLE COPY
J. Waugh.
Trimming Wall Paper.
No 219 A. I Patented Feb. 15, 1859.
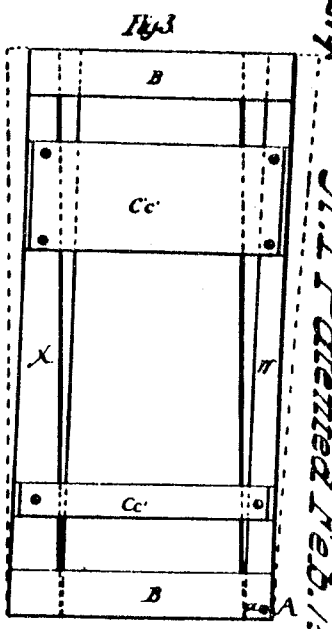
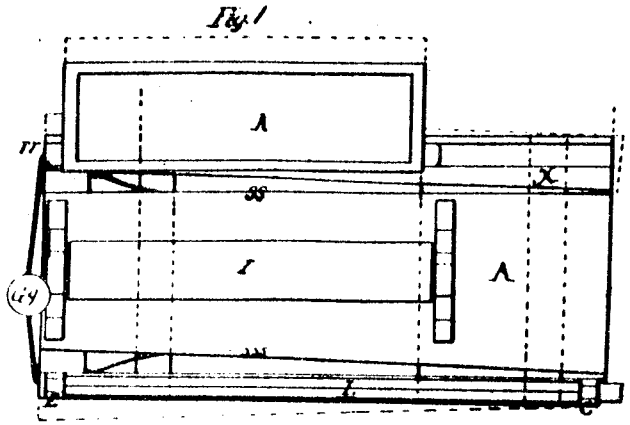
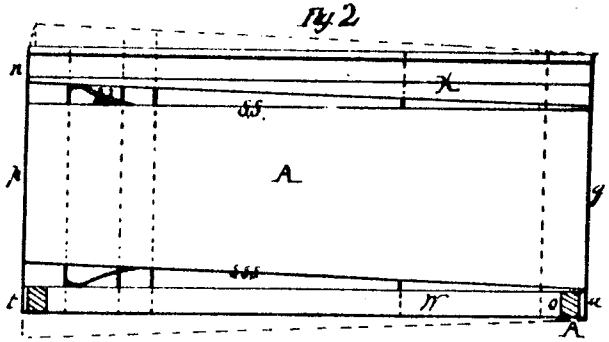
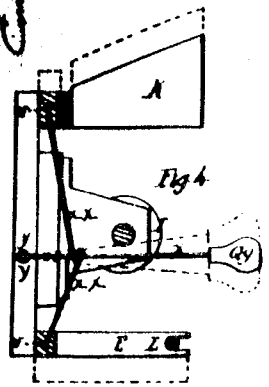
Witnesses:
E S Ingraham
John Parker
Inventor:
John Waugh